Dec. 11, 1923.

R. L. GARRETT ET AL 1,477,168

STEERING ARM

Original Filed May 7, 1921

Witnesses:
Hyman Berman
William Shicketus

Inventors
R. L. Garrett,
J. L. Goolsby.

By Clarence O'Brien.
Attorney

Patented Dec. 11, 1923.

1,477,168

UNITED STATES PATENT OFFICE.

ROBERT L. GARRETT AND JAMES LEE GOOLSBY, OF MARLIN, TEXAS, ASSIGNORS OF ONE-THIRD TO WILLIAM F. GILLETTE, OF FALLS COUNTY, TEXAS.

STEERING ARM.

Application filed May 7, 1921, Serial No. 467,682. Renewed September 29, 1923.

*To all whom it may concern:*

Be it known that we, ROBERT L. GARRETT and JAMES L. GOOLSBY, citizens of the United States, residing at Marlin, in the county of Falls and State of Texas, respectively, have invented new and useful Improvements in Steering Arms, of which the following is a specification.

The object of our present invention is the provision of a spindle arm drive control for automobiles, calculated to afford increased leverage to the steering wheel and to absorb shocks and jars so as to render the steering of the automobile easy and comfortable.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
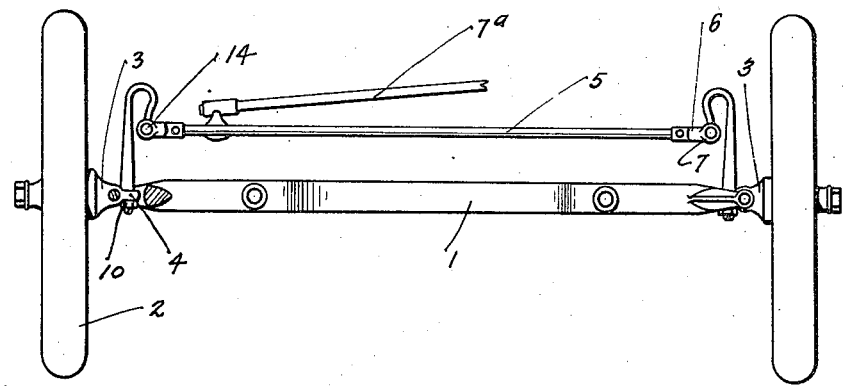
Figure 1 is a plan view illustrating our novel spindle arms as interposed between the connecting rod of an automobile and the arms on the steering knuckles.

In Figure 1 the front axle of the automobile is designated by 1, the forward wheels 2, and the knuckles that carry the spindles on which the wheels 2 are mounted are designated by 3, the said knuckles being of the construction common to a well known make of automobile and being provided with arms 4 in which are horizontally disposed apertures.

The connecting rod is designated by 5 having at its ends bifurcated portions 6 in the sides of which are apertures 7. To the said connecting rod 5 is connected the usual rod 7ª designed to be connected in conventional manner with the steering wheel (not shown) of the automobile.

Figure 2:
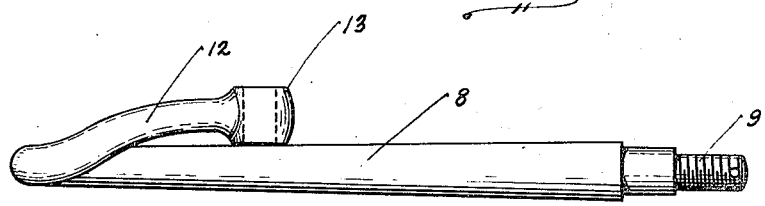
Figure 2 is an enlarged elevation of one of the spindle arms.
Figure 3:
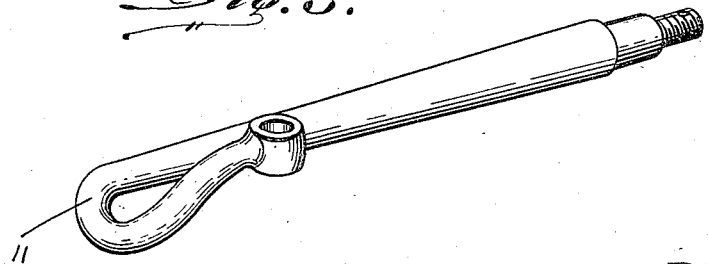
Figure 3 is a perspective of the same.

Our novel spindle arms are designated by 8 and inasmuch as the said arms are similar in construction a detailed description of the one shown in Figures 2 and 3 will suffice to impart a definite understanding of both. At one end the arm 8 is reduced and threaded as indicated by 9 to extend through and be secured in the horizontal aperture of the arm 4, the arm being preferably secured as stated through the medium of a nut 10. In rear of the arm 4 the arm 8 is preferably tapered rearwardly, and is merged into an inwardly and upwardly extending gooseneck 11, the arm 12 of which is bent as shown out of parallelism with the major portion of the arm 8 and is provided with a terminal eye 13. The said terminal eye 13 is designed and adapted to rest in the bifurcated portion 6 at one end of the rod 5 and to be pivotally connected to the said bifurcated portion through the medium of a pintle 14.

With the spindle arms 8 relatively arranged as shown it will be readily understood that increased leverage will be afforded to the steering wheel, and that shocks and jars will be effectively absorbed so that the transmission of the same to the steering wheel is precluded. In this connection we would say that in the actual reduction to practice of our invention the spindle arms 8 are 9 and ¾ inches with the result that the driver is given very much more power over the forward wheels 2 than is now the case. It will also be observed that the long spindle arms increase the control of the wheels so that the weakest person can comfortably drive an automobile on any kind of road.

Having described our invention, what we claim and desire to secure by Letters-Patent, is:—

The combination of the forward axle of an automobile, knuckles connected to said axle and having spindles and also having arms, steering arms connected to and extending rearwardly from said arms of the knuckles and having at their rear ends and inner sides goosenecks terminating in forwardly and upwardly extending portions, a rod interposed between and pivotally connected to the ends of the said gooseneck portions, and steering means connected with said interposed rod.

In testimony whereof, we affix our signatures.

ROBERT L. GARRETT,
JAMES LEE GOOLSBY.